(12) United States Patent
Tang

(10) Patent No.: US 7,855,898 B2
(45) Date of Patent: Dec. 21, 2010

(54) EXPANSION CARD RETENTION ASSEMBLY

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 423 days.

(21) Appl. No.: 12/164,127

(22) Filed: Jun. 30, 2008

(65) Prior Publication Data

US 2009/0168372 A1   Jul. 2, 2009

(51) Int. Cl.
*H05K 7/12* (2006.01)

(52) U.S. Cl. .................. 361/801; 361/726; 361/732; 361/759; 361/747; 312/223.2

(58) Field of Classification Search .................. 361/726, 361/732, 740, 747, 759, 801; 312/223.2, 312/223.3
See application file for complete search history.

(56) References Cited

U.S. PATENT DOCUMENTS 6,937,467 B2 * 8/2005 Hsu ........................ 361/679.41
6,960,720 B2 * 11/2005 Wen-Lung .................... 174/50
7,002,811 B2 * 2/2006 Jing et al. .................... 361/801
7,130,200 B1 * 10/2006 Liu ............................ 361/801
7,486,527 B1 * 2/2009 Yang .......................... 361/801
7,593,237 B2 * 9/2009 Tang .......................... 361/801
7,593,238 B2 * 9/2009 Tang .......................... 361/801
7,596,001 B2 * 9/2009 Tang .......................... 361/801

\* cited by examiner

*Primary Examiner*—Dameon E Levi
(74) *Attorney, Agent, or Firm*—Zhigang Ma

(57) ABSTRACT

An exemplary retention assembly (30) is used to assemble an expansion card mounted to an expansion card bracket (22) to an enclosure (24). The retention assembly includes a resisting catch (34), a rotatable holder (32), and a resisting lock (38). The resisting catch is slidable relative to the enclosure. The rotatable holder is rotatable relative to the enclosure around a first axis, and rotatably connected to the resisting catch around a second axis. The rotatable holder is configured for resisting to hold the expansion card bracket in position. The resisting lock is configured for resisting the resisting catch to prevent the resisting catch from sliding, and releasing the resistance of the resisting lock to the resisting catch for allowing the resisting catch sliding to make the rotatable holder rotating around the first axis, and the resisting catch rotating relative to the rotatable holder around the second axis.

20 Claims, 6 Drawing Sheets

EXPANSION CARD RETENTION ASSEMBLY

BACKGROUND OF THE INVENTION

1. Field of the Invention

The present invention generally relates to retention assemblies, particularly to an expansion card retention assembly for securing expansion card brackets with or without expansion card to an electronic device enclosure.

2. Discussion of the Related Art

Referring to FIG. 6, this shows a typical retention assembly used for securing expansion cards to an electronic device enclosure 13. The retention assembly includes a catching plate 11, a plurality of bolts 12, and a plurality of covers 14. Each of the covers 14 is either the one with various connection ports and forming part of an expansion card, or a spare cover used to cover a slot when the slot is not occupied by an expansion card. The electronic device enclosure 13 defines a plurality of vertical expansion slot (not visible). A bulge 132 is formed at a bottom of each expansion slot. The covers 14 are configured for covering the expansion slots and securing/protecting the expansion cards (not shown). Each of the covers 14 is an elongated piece having a bent top end, and a narrowed bottom end (not labeled) engaging in the corresponding bulge 132. When one or more expansion cards are fixed to the electronic device enclosure 13, the catching plate 11 is positioned on the bent portions of the covers 14. The catching plate 11 is then fixed on the electronic device enclosure 13 by the bolts 12 being engaged in screw holes defined in the enclosure 13, thereby fastening the covers 14 to the electronic device enclosure 13.

In the above retention assembly, the covers 14 are secured to the electronic device enclosure 13 by using the bolts 12. However, installing or removing the bolts 12 is unduly time-consuming and laborious. This decreases the efficiency of installation and removal of expansion cards. In addition, a tool for installing or removing the bolts 12 is usually needed. These problems are multiplied in mass production facilities. Furthermore, after a long period of use, bolts 12 and the screw holes will likely not keep reliably engaged with each other.

Therefore, a retention assembly which overcomes the above-described shortcomings is desired.

SUMMARY

An exemplary retention assembly includes a resisting catch, a rotatable holder and a resisting lock. The resisting catch is slidable relative to the enclosure. The rotatable holder is disposed between the resisting catch and the expansion card bracket. The rotatable holder is rotatable relative to the enclosure around a first axis, and rotatably connected to the resisting catch around a second axis parallel to the first axis. The rotatable holder is configured for resisting to hold the expansion card bracket in position. The resisting lock is configured for resisting the resisting catch to prevent the resisting catch from sliding relative to the enclosure. The resisting lock is further configured for being pushed to release the resistance of the resisting lock to the resisting catch for allowing the resisting catch sliding, to make the rotatable holder rotating relative to the enclosure around the first axis, and the resisting catch rotating relative to the rotatable holder around the second axis.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the retention assembly. Moreover, in the drawings, like reference numerals designate corresponding parts throughout the several views.

DETAILED DESCRIPTION OF THE EMBODIMENTS

Figure 1:
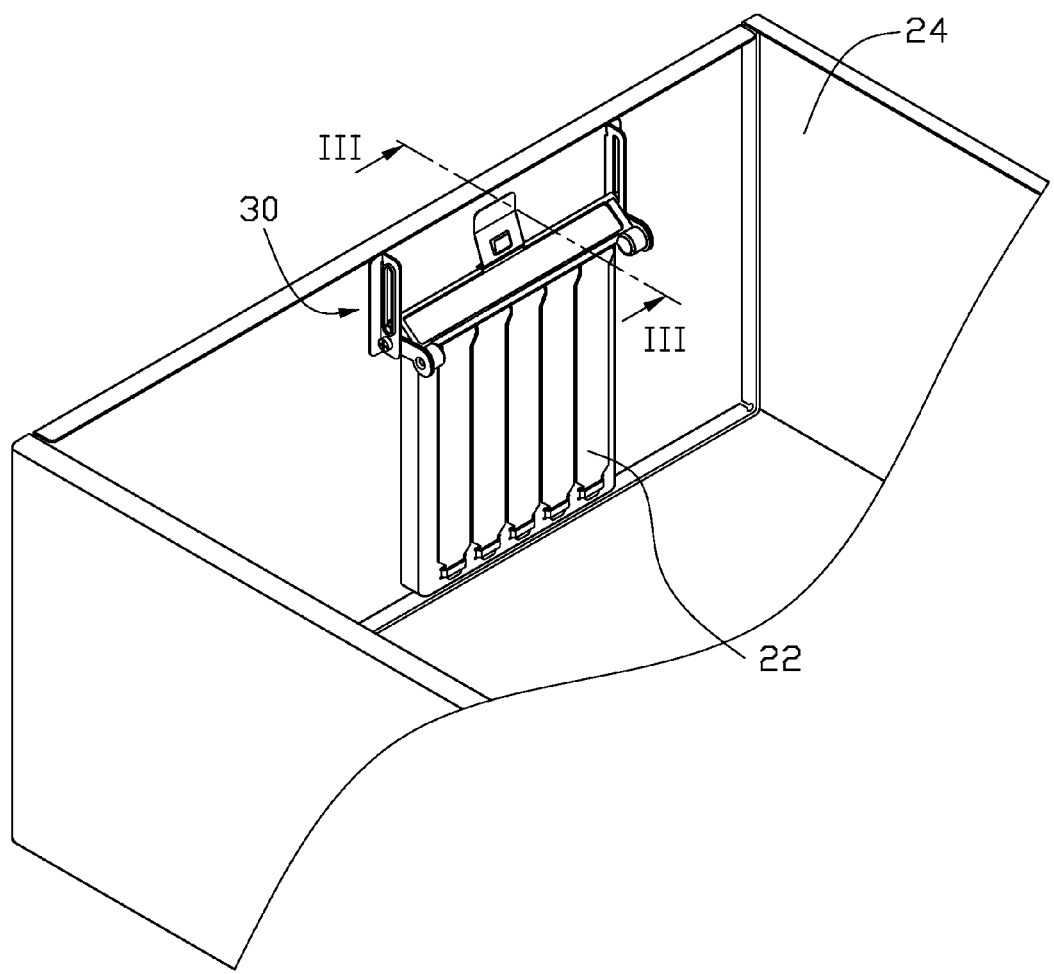
FIG. 1 is an assembled, isometric view of a retention assembly in a closed state in accordance with a preferred embodiment of the present invention, and showing the retention assembly assembled to an enclosure.
Figure 2:
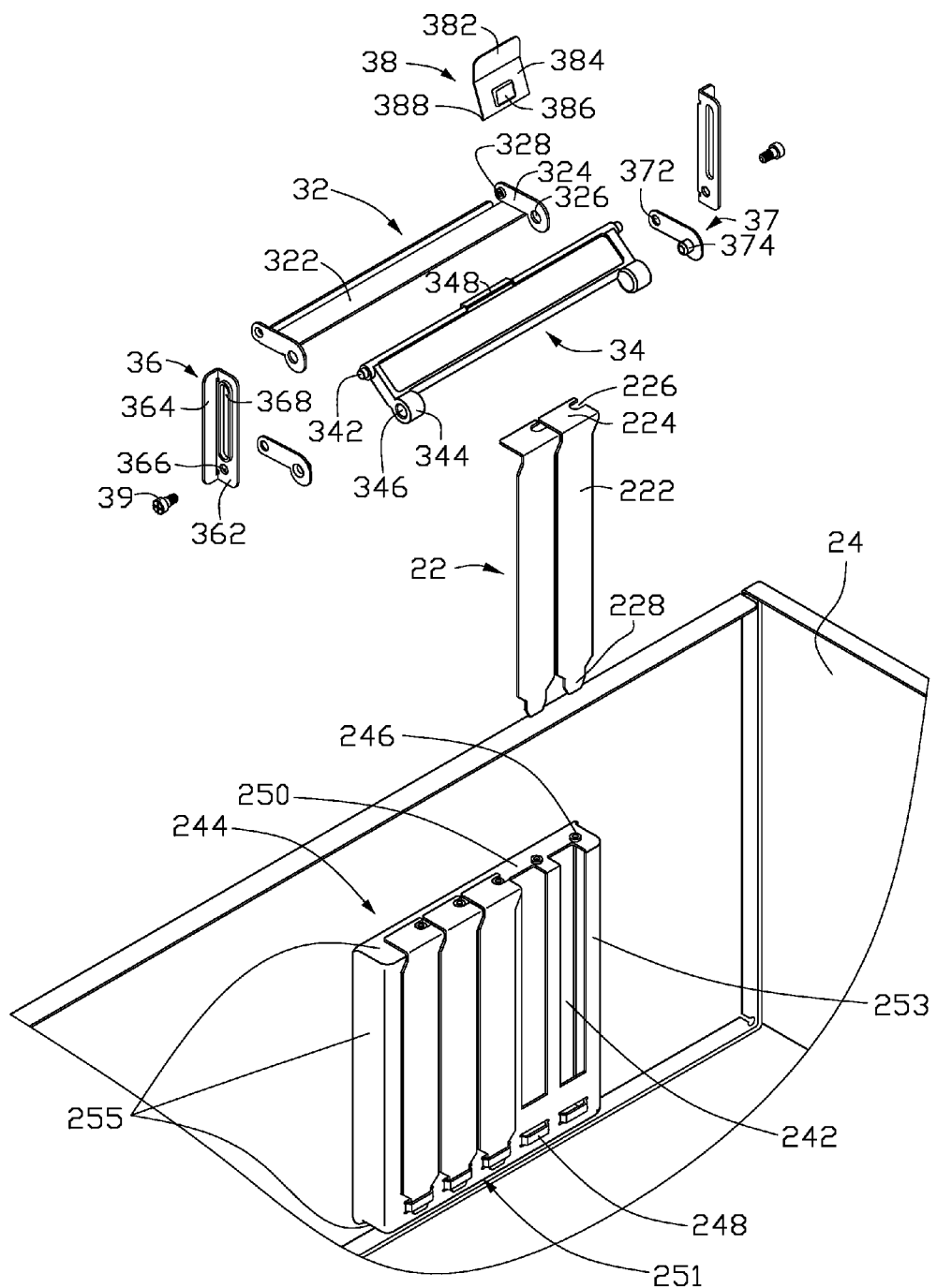
FIG. 2 is a partially exploded, isometric view of the retention assembly and the enclosure of FIG. 1.

Referring to FIGS. 1 and 2 in detail, FIG. 1 shows a retention assembly 30 of a preferred embodiment of the present invention assembled to an enclosure 24 such as an electronic device enclosure. The retention assembly 30 is configured to fasten expansion card brackets 22 of expansion cards (not shown) to the enclosure 24. For the purpose of explaining the inventive concept via the preferred embodiment, each of the expansion brackets 22 is either the one with various connection ports and forming part of an expansion card, or a spare expansion bracket 22 used to cover an expansion card slot 242 of the enclosure 24 when the expansion card slot 242 is not occupied by an expansion card.

For exemplary purposes, only one expansion bracket 22 will be detailed to clearly describe the preferred embodiment. Referring to FIG. 2, the expansion card bracket 22 includes an elongated main portion 222 and a fastening portion 224 extending substantially perpendicularly from one end of the elongated main portion 222. An edge of the fastening portion 224 defines a notch 226. The expansion card bracket 22 further includes a tab 228 extending from the other end of the elongated main portion 222 opposite to the fastening portion 224. A width of the tab 228 is smaller than that of the main portion 222.

The enclosure 24 includes an expansion card platform (rack) 244. The platform 244 has a seating surface 253, and peripheral walls 255 extending from the seating surface 253. In the illustrated embodiment, the seating surface 253 is substantially rectangular or square. One peripheral wall 255 defines a first surface 250, and an opposite peripheral wall 255 defines a second surface 251. The seating surface 253 defines a plurality of the expansion card slots 242, being elongated and substantially parallel to each other. For exemplary purposes, only one expansion card slot 242 will be detailed to clearly describe the preferred embodiment. The expansion card slot 242 extending from the first surface 250 towards but not reaching the second surface 251. The platform 244 further forms a plurality of positioning members 246 on the first surface 250, corresponding to a top of the expansion card slots 242; correspondingly, and a plurality of hooking members 248 on the seating surface 253 adjacent to the second surface 251, corresponding to a bottom of the expansion card slots 242. Each of the positioning members 246 is configured to be receivable in the notch 226 of the expansion bracket 22, and each of the hooking members 248 is configured to engagingly receive the tab 228 of the expansion bracket 22.

The retention assembly 30 includes a rotatable holder 32, a resisting catch 34, two frames 36, two pivot arms 37, and a resisting lock 38.

The rotatable holder 32 is an elongated cap preferably having a length corresponding to that of the first surface 250 of the platform 244 of the enclosure 24. The rotatable holder 32 includes a main sheet 322 and two pivot sheets 324 formed at opposite ends of the main sheet 322. The pivot sheets 324 are substantially perpendicular to the main sheet 322. Each pivot sheet 324 defines a connecting hole 326 and a pivot hole 328.

The resisting catch 34 is an elongated cap preferably having a length corresponding to that of the first surface 250 of the platform 244 of the enclosure 24. The resisting catch 34 includes two cylindrical guide poles 342 and two cylindrical connecting members 344 aligned at opposite ends of the resisting catch 34 correspondingly. The guide poles 342 extend towards opposite directions from the opposite ends of the resisting catch 34 and are aligned adjacent to a first side between the opposite ends of the resisting catch 34. The connecting members 344 extend towards directions facing each other and are formed adjacent to a second side opposite to the first side between the opposite ends of the resisting catch 34 correspondingly. Each connecting member 344 defines a pivot hole 346. The pivot holes 346 extend towards opposite directions from the opposite ends of the resisting catch 34. The resisting catch 34 further includes a nub 348 protruding at a middle portion of the lateral first side.

For exemplary purpose, only one frame 36 is described. The frame 36 includes a holding piece 362 and a mounting piece 364 perpendicular to the holding piece 362. The holding piece 362 defines a pivot hole 366 and an elongated sliding slot 368. The pivot hole 366 is adjacent to an end of the frame 36. The sliding slot 368 is configured for allowing a corresponding guide pole 342 of the resisting catch 34 capable of sliding inside the sliding slot 368. The frame 36 is fixed to the enclosure 24.

For exemplary purpose, only one pivot arm 37 is described. The pivot arm 37 is a sheet defining a pivot hole 372 at a first end and forming a pivot post 374 at a second end opposite to the first end. A distance between the center of the pivot hole 372 and the central axis of the pivot post 374 corresponds to a distance between the center of the connecting hole 326 and the center of the pivot hole 328 of the rotatable holder 32. The pivot post 374 is punched directly from the pivot arm 37. The retention assembly 30 further includes two pivot shafts 39. Each pivot shaft 39 is configured to be fastened into the pivot holes 366 of one corresponding frame 36, rotatably engaged in the pivot hole 372 of one corresponding pivot arm 37, and rotatably engaged in one pivot hole 328 of the rotatable holder 32. As such, the rotatable holder 32 and the pivot arms 37 may be rotatably connected to the frames 36. The pivot posts 374 of the pivot arms 37 are configured for fastening into the connecting holes 326 of the rotatable holders 32, and rotatably engaged in the pivot holes 346 of the resisting catch 34 correspondingly.

The resisting lock 38 is a sheet including a fixing portion 382 and a resisting portion 384 extending obliquely relative to the fixing portion 382. That is, an angle defined between the fixing portion 382 and the resisting portion 384 is larger than 0 degree and smaller than 180 degrees. In this embodiment, the angle is about 30 degrees. The resisting portion 384 forms a resisting protrusion 386 for resisting the nub 348 of the resisting catch 34. The resisting lock 38 further includes a secondary resisting fold 388 on another side of the 384 opposite to the fixing portion 382. The resisting fold 388 is substantially perpendicular to the resisting portion 384. The resisting lock 38 is elastic.

Figure 3:
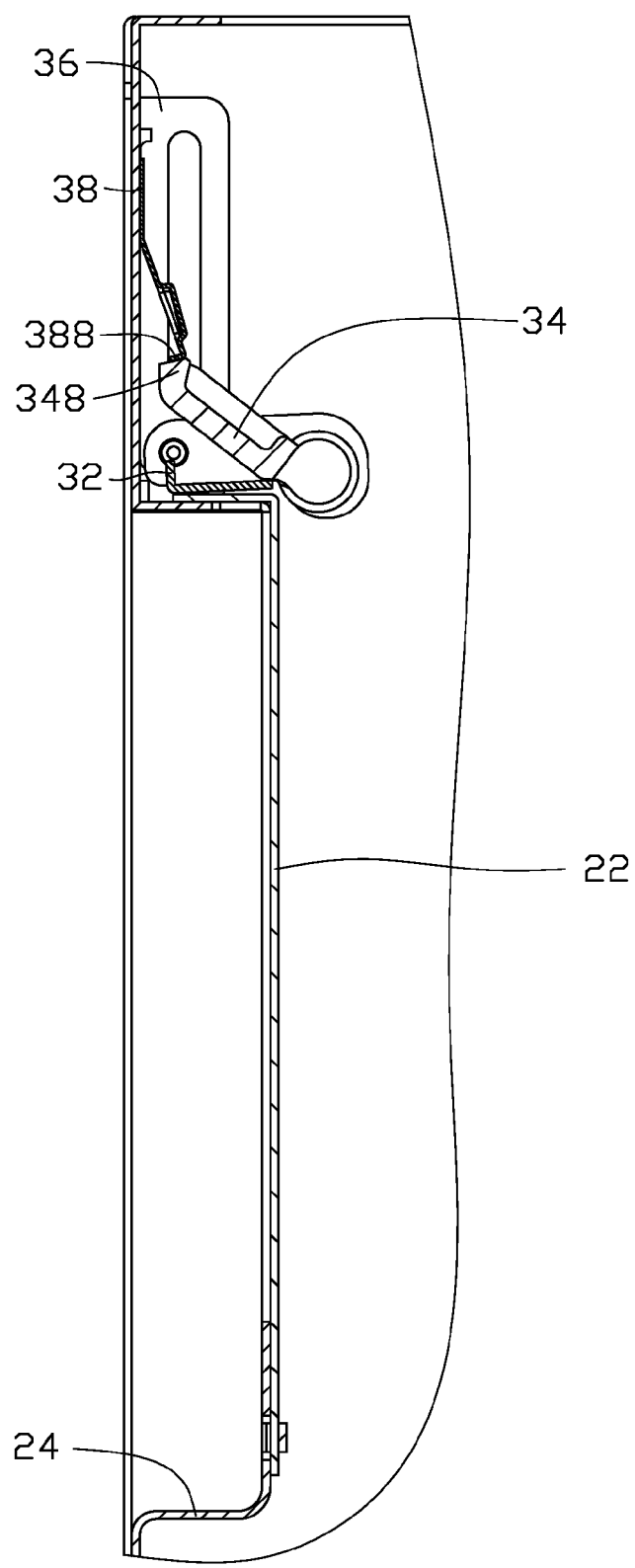
FIG. 3 is a cross-sectional view of FIG. 1 taken along line III-III.

Referring also to FIG. 3, to assemble the retention assembly 30, the pivot posts 374 of the pivot arms 37 are inserted into the connecting holes 326 of the rotatable holder 32 and the pivot holes 346 of the resisting catch 34 correspondingly, thus fastening the pivot arms 37 to the rotatable holder 32 and rotatably connecting the resisting catch 34 to the pivot arms 37 and the rotatable holder 32. The pivot shafts 39 are inserted into the pivot holes 366 of the frames 36, the pivot holes 372 of the pivot arms 37, and the pivot holes 328 of the rotatable holder 32 correspondingly, thus rotatably connecting the rotatable holder 32 and the pivot arms 37 to the frames 36. The guide poles 342 of the resisting catch 34 slidably engage in the sliding slots 368 of the frames 36 correspondingly. The frames 36 are fixed to the enclosure 24 and are positioned above the platform 244, with the rotatable holder 32 positioned between the first surface 250 of the enclosure 24 and the resisting catch 34. Finally, the resisting lock 38 is fixed to the enclosure 24 via the fixing portion 382, with the resisting lock 38 positioned above the resisting catch 34. A gap is defined between the resisting portion 384 and the enclosure 24, such that the resisting portion 384 may be pressed further close to the enclosure 24. In this embodiment, the frames 36 are fixed to the enclosure 24 by welding. Alternatively, other manners such as riveting, screwing may be employed. The resisting catch 34 may be fixed to the rotatable holder 32 by other manners such as welding and screwing.

In use, the retention assembly 30 has two states, an opened state and an closed state. Referring to FIG. 1 again, in the closed state, the retention assembly 30 holds the expansion brackets 22 to fastening expansion card(s) in the enclosure 24 or covering the expansion card slots 242 of the enclosure 24, if any, the tab 228 of the expansion card bracket 22 is inserted into the hooking member 248 and notch 226 of the expansion card bracket 22 engages with the positioning member 246. Referring to FIG. 3, in the closed state, the resisting lock 38 resists and positions the resisting catch 34, so that an edge of the resisting catch 34 can press and hold the rotatable holder 32. The guide poles 342 of the resisting catch 34 are at bottom ends of the sliding slots 368 of the frames 36. As such, the rotatable holder 32 holds the expansion card bracket(s) 22.

Figure 4:
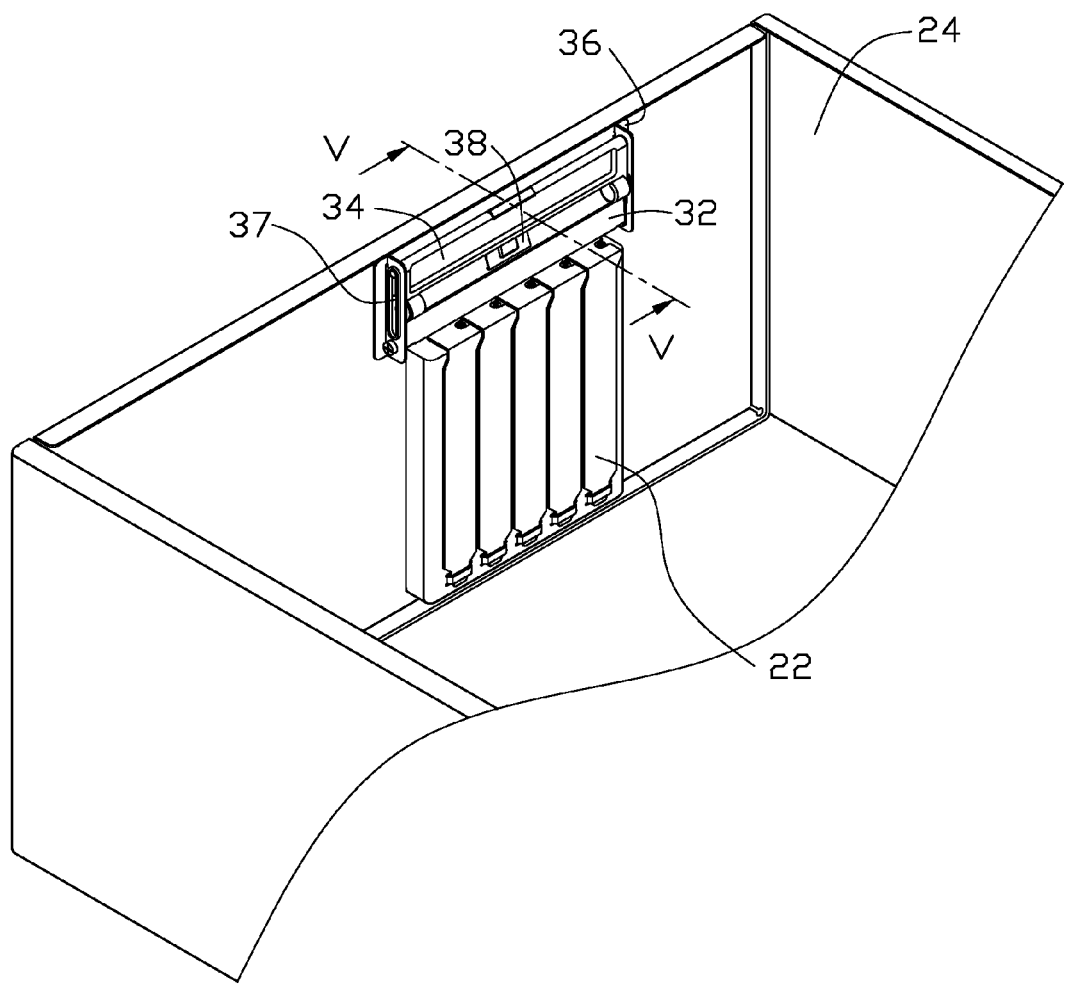
FIG. 4 is similar to FIG. 1, but showing a process of removing one of the covers of the retention assembly.
Figure 5:
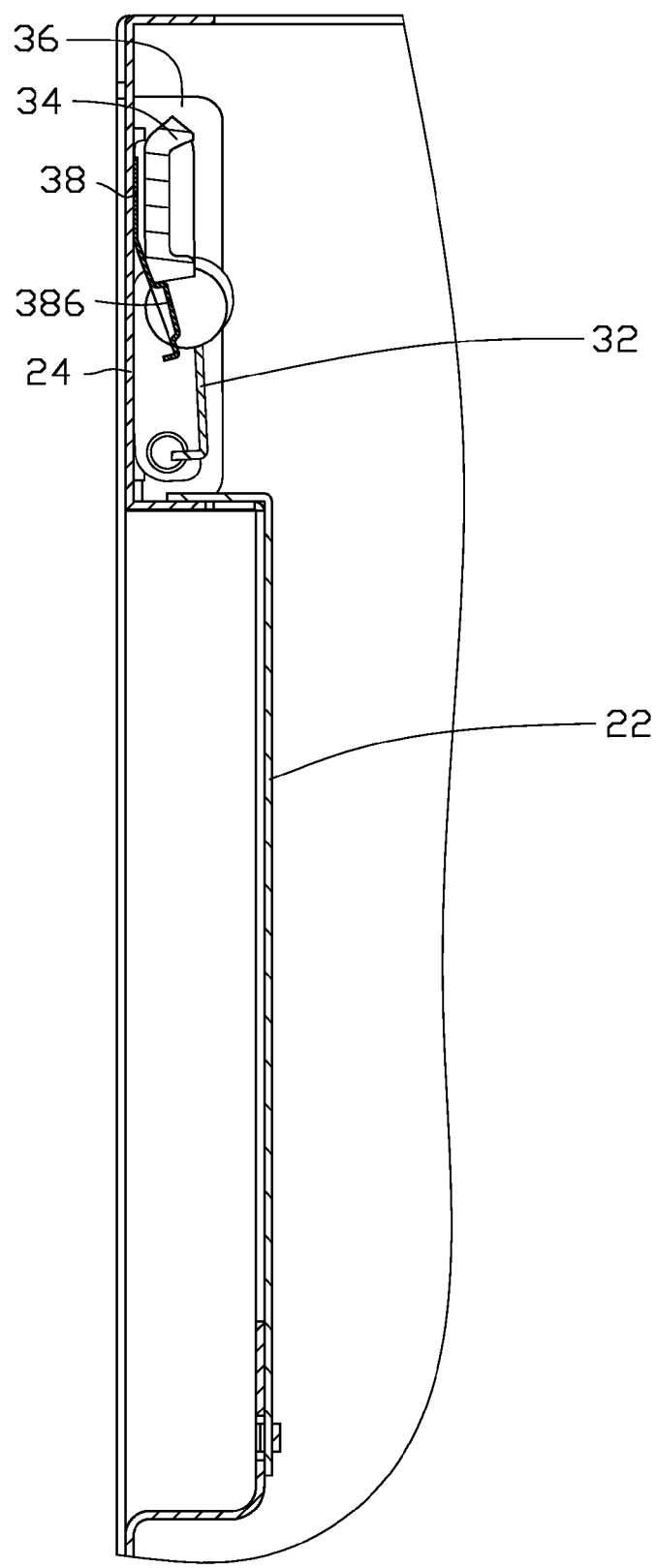
FIG. 5 is a cross-sectional view of FIG. 4 taken along line V-V.
Figure 6:
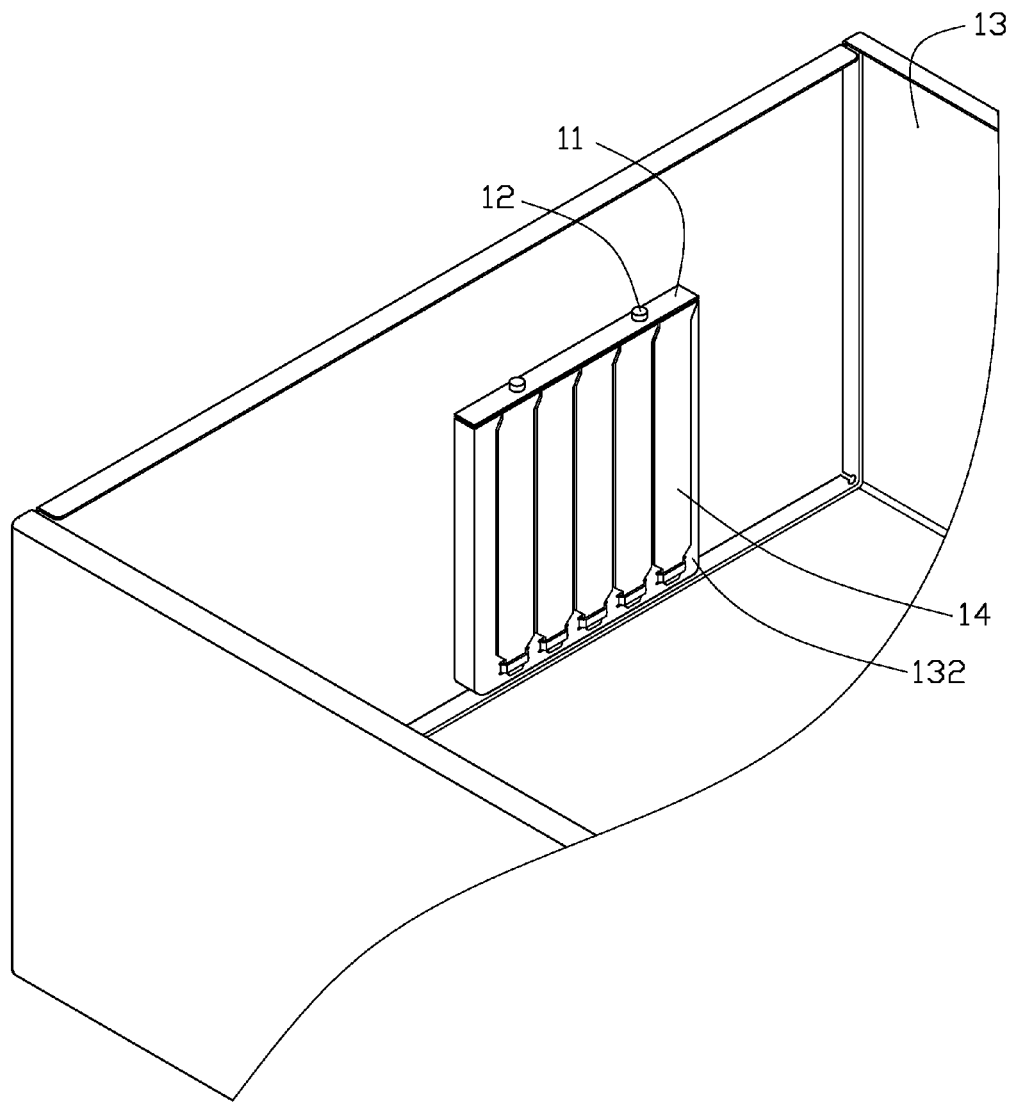
FIG. 6 is an assembled, isometric view of a part of an electronic device enclosure, the enclosure having a conventional expansion card retention assembly.

Referring to FIG. 4, and FIG. 5, to add or remove extra expansion cards, the retention assembly 30 is pulled from the closed state to the opened state. The resisting lock 38 is pushed to deform so as to deflect toward the enclosure 24, thus releasing the resistance of the resisting lock 38 to the resisting catch 34. Then the resisting catch 34 is pulled to make the guide poles 342 sliding in the sliding slots 368 of the frames 36 from the bottom ends to top ends. At the same time, the resisting catch 34 rotates around an axis of the connecting members 344 relative to the pivot arms 37 and the rotatable holder 32, also, the pivot arms 37 and the rotatable holder 32 rotate around an axis of the pivot shafts 39 relative to the frames 36 accordingly. In the process, the resisting lock 38 becomes released and returns to an original (free) state. When the guide poles 342 slide to the top ends of the sliding slots 368 of the frames 36, the resisting catch 34 cannot slide and rotate further; the retention assembly 30 is in the opened state. In the opened state, the resisting catch 34 is parallel to the sliding slots 368, and the rotatable holder 32 rotates to 90 degrees. As such, the rotatable holder 32 no longer resists the expansion card bracket 22, thus, the expansion card brackets 22 can then be removed from or mounted to platform 244. In the opened state, the edge of the resisting catch 34 resists the resisting protrusion 386 of the resisting lock 38 for preventing the resisting catch 34 from falling over due to a gravity thereof, thus facilitating add or remove extra expansion cards.

When the expansion card brackets 22 have been installed onto or detached from the enclosure 24, the resisting lock 38 is pushed to deform and deflect toward the enclosure 24. As a result, the resisting protrusion 386 is no longer resisting the edge of the resisting catch 34. The guide poles 342 slide in the sliding slots 368 and the resisting catch 34, also, the pivot arms 37 and the rotatable holder 32 rotate, such that retention assembly 30 returns to the closed state.

Alternatively, the frames 36 may be a part of the enclosure 24. The pivot arms 37 may be omitted. Instead, the rotatable holder 32 is rotatably connected to the frames 36 and the resisting catch 34 respectively. The rotatable holder 32 is rotatable relative to the frames 36 and the resisting catch 34 about different axes. The resisting protrusion 386 may be omitted.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A retention assembly for expansion card bracket, comprising:
   at least one frame;
   a resisting catch, the resisting catch being slidable relative to the at least one frame;
   a rotatable holder disposed between the resisting catch and the expansion card bracket, the rotatable holder rotatably connected to the at least one frame around a first axis, and rotatably connected to the resisting catch around a second axis parallel to the first axis; and
   a resisting lock for being fixed relative to the at least one frame;
   wherein when the retention assembly is in a closed state, the rotatable holder resists and holds the expansion card bracket, and the resisting lock resists the resisting catch to prevent the resisting catch from sliding relative to the at least one frame, when the retention assembly is pulled from the closed state to an opened state, the resisting lock is pushed to release the resistance of the resisting lock to the resisting catch, thus the resisting catch sliding relative to the at least one frame, the rotatable holder rotating relative to the at least frame around the first axis, and the resisting catch rotating relative to the rotatable holder around the second axis.

2. The retention assembly as claimed in claim 1, wherein the retention assembly is configured for mounting at least one expansion card bracket to an enclosure, the resisting lock is elastic and comprises a fixing portion and a resisting portion extending obliquely relative to the fixing portion, and the resisting portion extending obliquely relative to the fixing portion.

3. The retention assembly as claimed in claim 2, wherein the resisting catch forms a nub, the resisting portion of the resisting lock forms a resisting protrusion for resisting the nub of the resisting catch, the resisting lock further includes a resisting fold opposite to the fixing portion, and the resisting fold is configured for resisting an edge of the resisting catch in the opened state to prevent the resisting catch from sliding relative to the at least frame so as to maintain the opened state.

4. The retention assembly as claimed in claim 1, wherein the retention assembly further comprises two pivot arms, each pivot arm forms a pivot post at one end, the rotatable holder has a main sheet and two pivot sheets formed at opposite ends of the main sheet, each pivot sheet defines a connecting hole, the resisting catch forms two guide poles, each defining a pivot hole, at ends thereof, the pivot post of each pivot arm is fixedly inserted into the connecting hole of the rotatable holder, and rotatably engages in the pivot hole of the resisting catch.

5. The retention assembly as claimed in claim 4, wherein the number of the at least one frame is two, and the retention assembly further comprises two pivot shafts, an end opposite to the pivot post of each pivot arm defines a pivot hole, each pivot sheet of the rotatable holder defines a pivot hole, each frame defines a pivot hole, each pivot shaft is fixedly inserted into the pivot hole of one frame, and rotatably engages in the pivot hole of each pivot arm and one pivot hole of the rotatable holder, thus rotatably connecting the rotatable holder and the pivot arms to the frames.

6. The retention assembly as claimed in claim 5, wherein each frame defines a sliding slot, each of two ends of the resisting catch forms a guide pole, a distance exists between the guide pole and the connecting member formed at the same end.

7. The retention assembly as claimed in claim 6, wherein each frame includes a holding piece and a mounting piece perpendicular to the holding piece, the sliding slot and the pivot hole are defined in the mounting piece.

8. The retention assembly as claimed in claim 1, wherein the retention assembly is configured for installing one or more expansion card bracket to an enclosure, the at least one frame is fixed to the enclosure, each expansion card bracket defines a notch and forms a tab, the enclosure forms at least one positioning member configured to be received in the notch and at least one hooking member configured to be insertable by the tab.

9. The retention assembly as claimed in claim 8, wherein each expansion card bracket comprises an elongated main portion, a fastening portion formed at an end of the main portion, and the tab formed at an opposite end of the main portion, the fastening portion defines the notch at an edge.

10. The retention assembly as claimed in claim 9, wherein the enclosure comprises an expansion card platform extended perpendicularly inwards, the platform has a seating surface, and peripheral walls extending from the seating surface, one peripheral wall defines a first surface, an opposite peripheral wall defines a second surface, the seating surface defines at least one expansion card slot, the at least one positioning member is formed on the first surface, the at least one hooking member is formed on the seating surface adjacent to the second surface, corresponding to a bottom of one of the at least one expansion card slot.

11. The retention assembly as claimed in claim 10, wherein the platform of the enclosure is substantially rectangular, and has four surfaces including the first surface and the second surface.

12. A retention assembly for assembling expansion card brackets to an enclosure, comprising:
   a resisting catch, the resisting catch being slidable relative to the enclosure;
   a rotatable holder disposed between the resisting catch and the expansion card bracket, the rotatable holder being rotatable relative to the enclosure around a first axis, and rotatably connected to the resisting catch around a second axis parallel to the first axis, the rotatable holder configured for resisting to hold the expansion card bracket in position; and a resisting lock configured for resisting the resisting catch to prevent the resisting catch from sliding relative to the enclosure, and configured for being pushed to release the resistance of the resisting lock to the resisting catch for allowing the resisting catch sliding, to make the rotatable holder rotating relative to the enclosure around the first axis, and the resisting catch rotating relative to the rotatable holder around the second axis.

13. The retention assembly as claimed in claim 12, wherein the resisting lock is elastic and comprises a fixing portion and a resisting portion extending obliquely relative to the fixing portion, the resisting lock is fixed to the enclosure by the fixing portion and the resisting portion is spaced from the enclosure.

14. The retention assembly as claimed in claim 13, wherein the resisting catch forms a nub, the resisting portion of the resisting lock forms a resisting protrusion for resisting the nub of the resisting catch, the resisting lock further includes a resisting fold opposite to the fixing portion, and the resisting fold is configured for resisting an edge of the resisting catch in the opened state to prevent the resisting catch from sliding.

15. The retention assembly as claimed in claim 12, wherein the retention assembly further comprises two pivot arms, each pivot arm forms a pivot post at one end, the rotatable holder has a main sheet and two pivot sheets formed at opposite ends of the main sheet, each pivot sheet defines a connecting hole, the resisting catch forms two guide poles, each defining a pivot hole, at ends thereof, the pivot post of each pivot arm is fixedly inserted into the connecting hole of the rotatable holder, and rotatably engages in the pivot hole of the resisting catch.

16. The retention assembly as claimed in claim 15, wherein the retention assembly further comprises two pivot shafts and two frames, an opposite end of each pivot arm defines a pivot hole, each pivot sheet of the rotatable holder defines a pivot hole, each frame defines a pivot hole, each pivot shaft is fixedly inserted into the pivot hole of one frame, and rotatably engages in the pivot hole of each pivot arm and one pivot hole of the rotatable holder, thus rotatably connecting the rotatable holder and the pivot arms to the frames.

17. The retention assembly as claimed in claim 16, wherein each frame defines a sliding slot, each of two ends of the resisting catch forms a guide pole, a distance exists between the guide pole and the connecting member formed at the same end.

18. The retention assembly as claimed in claim 17, wherein each expansion card bracket defines a notch and forms a tab, the enclosure forms at least one positioning member configured to be received in the notch and at least one hooking member configured to be insertable by the tab.

19. The retention assembly as claimed in claim 18, wherein each expansion card bracket comprises an elongated main portion, a fastening portion formed at an end of the main portion, and the tab formed at an opposite end of the main portion, the fastening portion defines the notch at an edge.

20. The retention assembly as claimed in claim 19, wherein the enclosure comprises an expansion card platform extended perpendicularly inwards, the platform has a seating surface, and peripheral walls extending from the seating surface, one peripheral wall defines a first surface, an opposite peripheral wall defines a second surface, the seating surface defines at least one expansion card slot, the at least one positioning member is formed on the first surface, the at least one hooking member is formed on the seating surface adjacent to the second surface, corresponding to a bottom of one of the at least one expansion card slot.

* * * * *